(12) United States Patent
Namikawa (10) Patent No.: US 11,329,325 B2
(45) Date of Patent: May 10, 2022

(54) BREAKER AND SAFETY CIRCUIT PROVIDED WITH SAME

(71) Applicant: BOURNS KK, Osaka (JP)

(72) Inventor: Masashi Namikawa, Osaka (JP)

(73) Assignee: BOURNS KK, Osaka (JP)

( * ) Notice: Subject to any disclaimer, the term of this patent is extended or adjusted under 35 U.S.C. 154(b) by 119 days.

(21) Appl. No.: 16/617,347

(22) PCT Filed: May 17, 2018

(86) PCT No.: PCT/JP2018/019142
§ 371 (c)(1),
(2) Date: Nov. 26, 2019

(87) PCT Pub. No.: WO2018/221249
PCT Pub. Date: Dec. 6, 2018

(65) Prior Publication Data
US 2021/0126291 A1   Apr. 29, 2021

(30) Foreign Application Priority Data

Jun. 1, 2017 (JP) .............................. JP2017-109460

(51) Int. Cl.
*H01M 10/42* (2006.01)
*H01H 37/54* (2006.01)
*H01H 37/04* (2006.01)

(52) U.S. Cl.
CPC .......... *H01M 10/425* (2013.01); *H01H 37/04* (2013.01); *H01H 37/54* (2013.01); *H01H 2037/5463* (2013.01)

(58) Field of Classification Search
CPC ..... H01M 10/425; H01H 37/04; H01H 37/54; H01H 2037/5463

(Continued)

(56) References Cited

U.S. PATENT DOCUMENTS 3,322,920 A    5/1967 Morris
4,135,081 A *  1/1979 Fischer ................. F24C 15/105
                                                   219/448.19

(Continued)

FOREIGN PATENT DOCUMENTS

JP    62-222529    9/1987
JP     9-56113     2/1997

(Continued)

OTHER PUBLICATIONS

International Search Report and Written Opinion dated Jun. 12, 2018, in International Application No. PCT/JP2018/019142, with English translation, 9 pages.

*Primary Examiner* — Anatoly Vortman
(74) *Attorney, Agent, or Firm* — Knobbe Martens Olson & Bear LLP (57) ABSTRACT

The breaker 1 is provided with a fixed contact 20, a movable piece 4 extending in a first direction (D1), a thermally actuated element 5, a case 7 accommodating the movable piece 4 and the thermally actuated element 5, and a terminal piece 2 which partially protrudes outside the case 7 and is to be electrically connected with an external circuit. The terminal piece 2 has a first portion 21 and a second portions 22 having different heights from a bottom surface of the case 7, a first bent portion (23*a*) bent in a first bending direction, and a second bent portion (23*b*) bent in a second bending direction opposite to the first bending direction. The first bent portion (23*a*) and the second bent portion (23*b*) extend in parallel with the first direction (D1).

13 Claims, 8 Drawing Sheets

(58) Field of Classification Search
USPC .............................................................. 429/7
See application file for complete search history.

(56) References Cited

U.S. PATENT DOCUMENTS

| | | | | | |
|---|---|---|---|---|---|
| 4,682,138 | A | * | 7/1987 | Sell | H01H 73/303 |
| | | | | | 337/66 |
| 5,268,664 | A | * | 12/1993 | Givler | H01H 37/5418 |
| | | | | | 337/112 |
| 5,548,266 | A | * | 8/1996 | Murphy | H01H 37/18 |
| | | | | | 337/347 |
| 6,633,222 | B2 | * | 10/2003 | Nagai | H01M 50/572 |
| | | | | | 337/365 |
| 9,460,876 | B2 | * | 10/2016 | Namikawa | H01H 37/5427 |
| 9,653,240 | B2 | * | 5/2017 | Namikawa | H01H 37/04 |
| 9,715,980 | B2 | * | 7/2017 | Namikawa | H01H 37/04 |
| 2001/0050609 | A1 | * | 12/2001 | Takeda | H01H 37/5427 |
| | | | | | 337/333 |
| 2012/0299690 | A1 | * | 11/2012 | Nakanishi | H01M 50/581 |
| | | | | | 337/38 |
| 2013/0214895 | A1 | * | 8/2013 | Ullermann | H01H 37/60 |
| | | | | | 337/377 |
| 2014/0285308 | A1 | * | 9/2014 | Namikawa | H01H 37/04 |
| | | | | | 337/1 |
| 2014/0334055 | A1 | * | 11/2014 | Namikawa | H01H 37/04 |
| | | | | | 361/115 |
| 2016/0035521 | A1 | * | 2/2016 | Namikawa | H01H 37/5427 |
| | | | | | 337/380 |
| 2016/0035522 | A1 | * | 2/2016 | Namikawa | H01H 37/52 |
| | | | | | 337/362 |

FOREIGN PATENT DOCUMENTS

| | | |
|---|---|---|
| JP | 2001256873 A * | 9/2001 |
| JP | 2004-134118 | 4/2004 |
| JP | 2004-311352 | 11/2004 |
| JP | 2014235913 A * | 12/2014 |
| JP | 2016-35822 | 3/2016 |
| WO | WO 2004/084248 A1 | 9/2004 |

* cited by examiner

BREAKER AND SAFETY CIRCUIT PROVIDED WITH SAME

TECHNICAL FIELD

The present invention relates to a small breaker or the like built in a secondary battery pack or the like of an electric device.

BACKGROUND ART

Conventionally, a breaker is used as a protection device (safety circuit) for secondary batteries and motors of various electric devices. An abnormality occurs such as when the temperature of the secondary battery rises excessively during charging or discharging, or when an overcurrent flows through a motor or the like equipped in a device such as an automobile or home appliance, the breaker Cut off the current to protect the secondary batteries and the motors. In order to ensure the safety of equipment, a breaker used as such a protection device is required to operate accurately following temperature changes (having good temperature characteristics) and to have a stable resistance value when energized.

The breaker is provided with a thermally actuated element that operates according to a temperature change so as to conduct or cut off a current. Patent Document 1 has disclosed a breaker for which a bimetal is used as the thermally actuated element. Bimetal is an element that is formed by laminating two types of plate-shaped metal materials having different coefficients of thermal expansion, and controls the conduction state of the contact by changing its shape in accordance with a temperature change. The breaker shown in the above document is formed by parts such as a fixed piece, a terminal piece, a movable piece, a thermally actuated element, and a PTC thermistor housed in a case with the terminals of the fixed piece and the terminal piece protruding from the case, and Used by connecting to the electrical circuit of electrical equipment.

PRIOR ART DOCUMENT

Patent Document

Patent document 1: Japanese Patent Application Publication No. 2016-035822

SUMMARY OF THE INVENTION

Problems to be Solved by the Invention

Further, when the breaker is used as the protection device for a secondary battery or the like installed in an electric device such as a notebook personal computer, a tablet-type portable information terminal device, or a thin-type multi-functional mobile phone called a smartphone, miniaturization is required in addition to ensuring the safety described above. In particular, in recent portable information terminal devices, users have a strong desire for miniaturization (thinning), and with respect to devices newly released by each manufacturer, the tendency to be designed to be small is remarkable in order to ensure superiority in design. Under such a background, breakers that are mounted together with secondary batteries as one component of portable information terminal devices are also strongly required to be further miniaturized.

The present invention has been made to solve the above-described problems, and an object thereof is to provide a breaker that can be easily reduced in size.

Means for Solving the Problem

In order to achieve the above objective, the present invention is a breaker including a fixed contact, a movable piece including an elastic portion, which extends in a first direction and deforms elastically, and a movable contact arranged at an end portion on one side of the elastic portion, and having the movable contact so as to be pressed against and in contact with the fixed contact, a thermally actuated element actuating the movable piece such that the movable contact is separated from the fixed contact by being deformed in accordance with a temperature change, a case accommodating the movable piece and the thermally actuated element, and a terminal piece which partially protrudes outside the case and is to be electrically connected with an external circuit, characterized in that the terminal piece has a first portion having a first height from a bottom surface of the case, a second portion connected to the external circuit at a second height, which is lower than the first height, from the bottom surface of the case, a third portion connecting the first portion and the second portion, a first bent portion bent in a first bending direction in a region where the first portion and the third portion intersect, and a second bent portion bent in a second bending direction opposite to the first bending direction in a region where the second portion and the third portion intersect, and the first bent portion and the second bent portion extend in parallel with the first direction.

In the breaker according to the present invention, it is preferred that the fixed contact is formed in the first portion.

In the breaker according to the present invention, it is preferred that an end portion on the other side of the elastic portion is electrically connected with the first portion.

In the breaker according to the present invention, it is preferred that the case has an internal space for accommodating the movable piece and the thermally actuated element, a first surface, which is located on the opposite side of the bottom surface, of the first portion is exposed to the internal space, and the second portion is embedded in the case such that the first surface of the second portion is not exposed to the internal space.

In the breaker according to the present invention, it is preferred that a second surface, which is located on a side of the bottom surface, of the second portion is exposed to the outside of the case.

In the breaker according to the present invention, it is preferred that the terminal piece has a first protruding portion extending from the first portion in the first direction so as to protrude outside the case.

In the breaker according to the present invention, it is preferred that the terminal piece has a second protruding portion extending from the second portion in a second direction perpendicular to the first direction so as to protrude outside the case.

In the breaker according to the present invention, it is preferred that the second protruding portion is arranged at each end portion in the second direction of the terminal piece.

The safety circuit for an electric device according to the present invention is characterized in that it includes the above-described breaker.

Advantageous Effects of the Invention

According to the breaker of the present invention, the first portion and the second portion of the terminal piece are arranged at different heights by the first bent portion that is bent in the first bending direction and the second bent portion that is bent in the second bending direction, and the first bent portion and the second bent portion extend in parallel with the elastic portion of the movable piece. Thereby, the second portion extends from the first portion in a direction perpendicular to the first direction and is connected to the external circuit. Therefore, the length dimension of the breaker in the first direction can be decreased.

BRIEF DESCRIPTION OF THE DRAWINGS

FIG. 3 a cross-sectional view showing the above-mentioned breaker in an overcharged state or an abnormality and the like.

MODE FOR CARRYING OUT THE INVENTION

First Embodiment

A breaker according to an embodiment of the first invention of the present invention will now be described below in detail in conjunction with accompanying drawings. FIGS. 1 to 4 show a configuration of the breaker. The breaker 1 includes a first terminal piece 2 and a second terminal piece 3 which are partially exposed from a case 7 to the outside. The terminal pieces 2 and 3 are electrically connected to an external circuit (not shown), so that the breaker 1 constitutes a main part of a safety circuit of an electric device.

Figure 1:
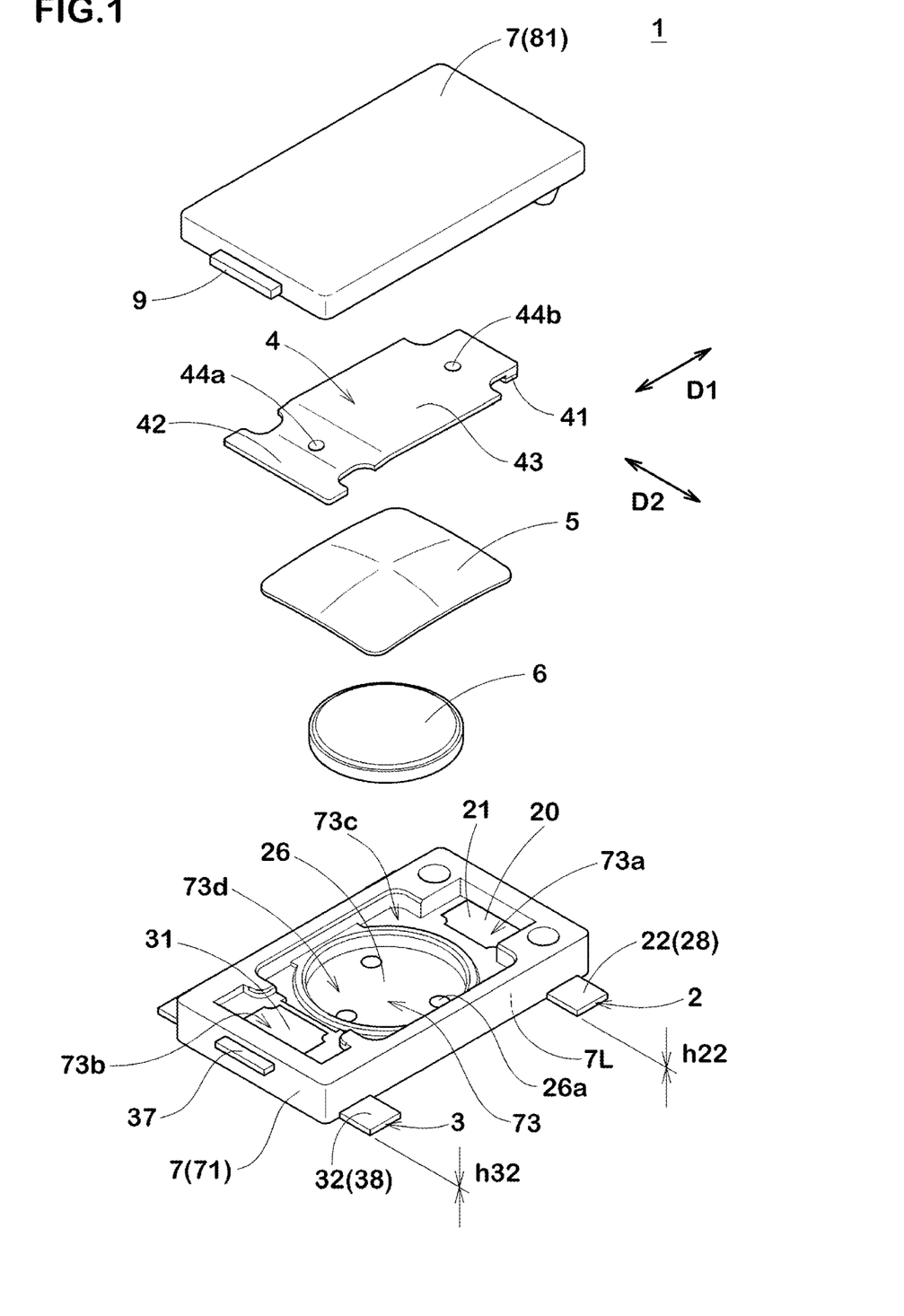
FIG. 1 a perspective view showing schematic configuration of a breaker, before assembly, according to one Embodiment of the present invention.

The breaker 1 includes a fixed contact 20, the terminal pieces 2 and 3, a movable piece 4 having a movable contact 41 at a tip portion thereof, a thermally actuated element 5 that deforms in accordance with a temperature change, and a PTC (Positive Temperature Coefficient) thermistor 6, the case 7 which accommodates the terminal pieces 2 and 3, the movable piece 4, the thermally actuated element 5, and the PTC thermistor 6, and the like. The case 7 is composed of a case main body (first case) 71, a lid member (second case) 81 attached to an upper surface of the case main body 71, and the like.

The fixed contact 20 is formed by cladding, plating or coating of an electrically conductive material such as copper, silver alloy, gold-silver alloy, in addition to silver, nickel, nickel-silver alloy. The fixed contact 20 is formed at a position facing the movable contact 41 of the terminal piece 2, and is exposed to a housing concave portion 73 of the case main body 71 through a part of an opening (73a) formed inside the case main body 71.

The terminal pieces 2 and 3 are formed by pressing metal plates mainly composed of copper or the like (in addition, metal plates of copper-titanium alloy, nickel silver, brass, or the like), and they are embedded in the case main body 71 by insert molding, for example.

The terminal piece 2 has a first portion 21 having a first height (h21) from a second surface (7L) of the case 7 (which hereinafter may be referred to as a bottom surface of the case main body 71) and second portions 22 connected to the external circuit at a second height (h22) from the bottom surface of the case main body 71. The first portion 21 and the second portions 22 are arranged in parallel with the bottom surface of the case main body 71. The second height (h22) is lower than the first height (h21), and in the present embodiment, bottom surfaces of the second portions 22 coincide with the bottom surface of the case main body 71.

The fixed contact 20 is formed in the first portion 21. The terminal piece 2 includes a step bent portion 25 bent in a step shape (a crank shape in a side view) and a support portion 26 that supports the PTC thermistor 6. The step bent portion 25 connects the first portion 21 and the support portion 26 such that the first portion 21 and the support portion 26 are arranged at different heights. The PTC thermistor 6 is placed on a protrusions (dowels) (26a) formed in a convex manner at three locations in the support portion 26 and supported by the protrusions (26a).

Figure 4:
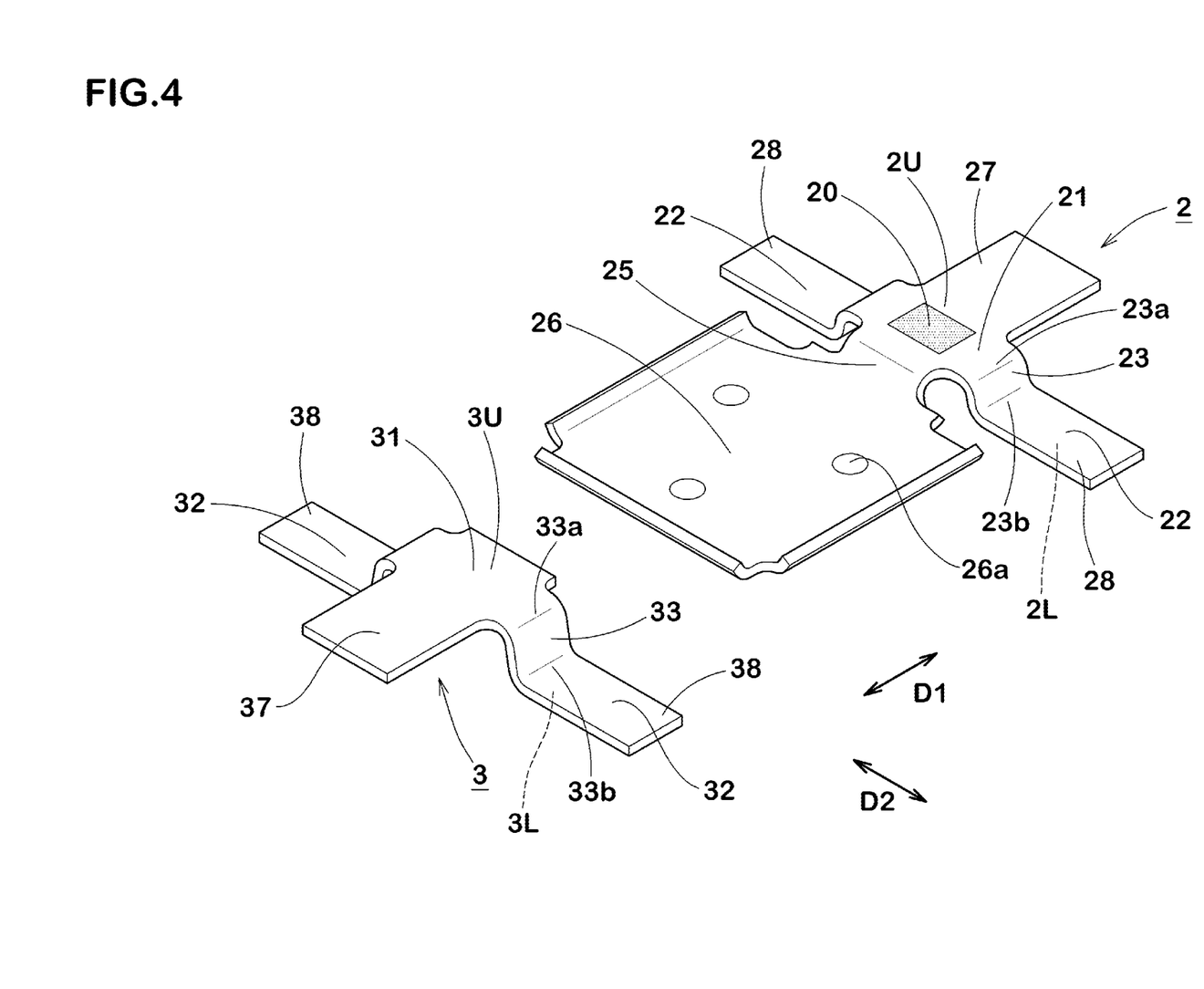
FIG. 4 a perspective view showing the configuration of the terminal pieces of the above-mentioned breaker.

In the present application, unless otherwise specified, in the terminal piece 2, the surface on which the fixed contact 20 is formed (that is, the upper surface in FIG. 1) is described as a first surface (2U), and the bottom surface on the opposite side is described as a second surface (2L) (see FIG. 4). The same applies to other parts such as the terminal piece 3, the movable piece 4, the thermally actuated element 5, the case 7, and the like, for example.

The second portions 22 are exposed to the outside of the case 7 on the second surface (2L). Thereby, the second portions 22 and the external circuit can be electrically connected. A soldering method is used for the connection between the second portions 22 and the external circuit, for example. The second portions 22 and a land of the external circuit are soldered in an area including the second surface (2L) at each of the second portions 22. Therefore, the solder may wrap around the side surfaces of the second portions 22 protruding from the case 7 and the first surface (2U).

The terminal piece 3 has a first portion 31 having a first height (h31) from the bottom surface of the case main body 71 and second portions 32 connected to the external circuit at a second height (h32) from the bottom surface of the case main body 71. The first portion 31 and the second portions 32 are arranged in parallel with the bottom surface of the case main body 71. The second height (h32) is lower than the first height (h31), and in this embodiment, bottom surfaces of the second portions 32 coincide with the bottom surface of the case main body 71.

The first portion 31 of the terminal piece 3 is electrically connected to the movable piece 4 at a first surface (3U). The first surface (3U) of the first portion 31 is exposed to the housing concave portion 73 of the case main body 71 through an opening (73b) provided inside the case main body 71 and is electrically connected to the movable piece 4.

The second portions 32 are exposed to the outside of the case 7 on a second surface (3L). Thereby, similar to the terminal piece 2, the second portions 32 and the external circuit can be electrically connected.

The movable piece 4 is formed by pressing a plate-shaped metal material mainly composed of copper or the like. The movable piece 4 is formed in an arm shape symmetrical with respect to a center line thereof in a longitudinal direction thereof.

The movable contact 41 is formed at one end portion of the movable piece 4. The movable contact 41 is formed on a second surface of the movable piece 4 by the same or similar material as that of the fixed contact 20, and is joined to a tip portion of the movable piece 4 by a method such as clad or crimping in addition to welding.

At the other end portion of the movable piece 4, a connection portion 42 to be electrically connected to the first portion 31 of the terminal piece 3 is formed. The first portion 31 of the terminal piece 3 and the connection portion 42 of the movable piece 4 are fixed by laser welding. Laser welding is a welding technique in which workpieces are joined by irradiating workpieces (which are the terminal piece 3 and the movable piece 4 in the present embodiment) with laser light and locally melting and solidifying the workpieces. On the surface of the workpiece irradiated with laser light, a laser welding mark having a form different from the welding mark by other welding technique (for example, resistance welding using Joule heat) is formed.

The movable piece 4 has an elastic portion 43 between the movable contact 41 and the connection portion 42. The elastic portion 43 extends from the connection portion 42 toward the movable contact 41. Thereby, the connection portion 42 is provided on the side opposite to the movable contact 41 with the elastic portion 43 interposed therebetween. In the present application, the longitudinal direction of the movable piece along which the elastic portion 43 extends is defined as a first direction (D1), and the short direction perpendicular thereto is defined as a second direction (D2).

At the connection portion 42, the movable piece 4 is fixed by being fixed to the first portion 31 of the terminal piece 3, and by the elastic portion 43 being elastically deformed, the movable contact 41 formed at the tip of the elastic portion 43 is pressed against and in contact with the fixed contact 20, thereby, the terminal piece 2 and the movable piece 4 can be energized. Since the movable piece 4 and the terminal piece 3 are electrically connected at the first portion 31 and the connection portion 42, the terminal piece 2 and the terminal piece 3 can be energized.

The movable piece 4 is curved or bent by press working in the elastic portion 43. The degree of curving or bending is not particularly limited as long as the thermally actuated element 5 can be accommodated, and may be appropriately set in consideration of elastic force at an operating temperature and a reset temperature, contact pressure of the contact point, and the like. In addition, a pair of protrusions (contact portions) (44a) and (44b) is formed on a second surface of the elastic portion 43 so as to face the thermally actuated element 5. The protrusions (44a) and (44b) and the thermally actuated element 5 come into contact with each other, and the deformation of the thermally actuated element 5 is transmitted to the elastic portion 43 through the protrusions (44a) and (44b) (see FIGS. 1 and 3).

The thermally actuated element 5 has an initial shape which is curved in an arc shape and is formed by laminating thin plate materials having different coefficients of thermal expansion. When the operating temperature is reached by overheating, the curved shape of the thermally actuated element 5 is warped in reverse with a snap motion and is restored when the temperature falls below the reset temperature due to cooling. The initial shape of thermally actuated element 5 can be formed by press working. As long as the elastic portion 43 of the movable piece 4 is pushed up by the reverse warping motion of the thermally actuated element 5 at the desired temperature and returns to its initial state by the elastic force of the elastic portion 43, the material and the shape of the thermally actuated element 5 are not particularly limited, but a rectangular shape is preferred from the point of view of productivity and efficiency of the reverse warping operation, and a rectangular shape close to a square is more preferred in order to efficiently push up the elastic portion 43 while being small. Note that, as the materials of the thermally actuated element 5, a laminate of two types of materials having different coefficients of thermal expansion made of various alloys such as nickel silver, brass, and stainless steel, for example, copper-nickel-manganese alloy or nickel-chromium-iron alloy on the high expansion side, and iron-nickel alloy on the low expansion side, is used in combination according to the required conditions.

The PTC thermistor 6 is arranged between the support portion 26 of the terminal piece 2 and the thermally actuated element 5. That is, the support portion 26 is located directly below the thermally actuated element 5 with the PTC thermistor 6 in between. When the energization of the terminal piece 2 and the movable piece 4 is interrupted by the reverse warping operation of the thermally actuated element 5, the current flowing in the PTC thermistor 6 is increased. As long as the PTC thermistor 6 is a positive temperature coefficient thermistor which limits the current by increasing the resistance value as the temperature increases, the type of the PTC thermistor 6 can be selected according to the requirements such as operating current, operating voltage, operating temperature, reset temperature, and the like, and the materials and the shape are not particularly limited as long as these properties are not impaired. In this embodiment, a ceramic sintered body containing barium titanate, strontium titanate or calcium titanate is used. In addition to the ceramic sintered body, a so-called polymer PTC in which electrically conductive particles such as carbon are contained in a polymer may be used.

The case main body 71 and the lid member 81 constituting the case 7 are made of thermoplastic resin such as flame retardant polyamide, polyphenylene sulfide (PPS) having excellent heat resistance, liquid crystal polymer (LCP), polybutylene terephthalate (PBT), and the like. A material other than the resin may be used as long as characteristics equal to or higher than those of the above-described resin can be obtained.

The case main body 71 is formed with the housing concave portion 73 which is an internal space for accommodating the movable piece 4, the thermally actuated element 5, the PTC thermistor 6, and the like. The housing concave portion 73 has the openings (73a) and (73b) for accommodating the movable piece 4, an opening (73c) for accommodating the movable piece 4 and the thermally actuated element 5, an opening (73d) for accommodating the PTC thermistor 6, and the like. Note that edges of the movable piece 4 and the thermally actuated element 5 incorporated in the case main body 71 are in contact with a frame formed inside the housing concave portion 73, and are guided by the frame when the thermally actuated element 5 is reversely warped.

Figure 2:
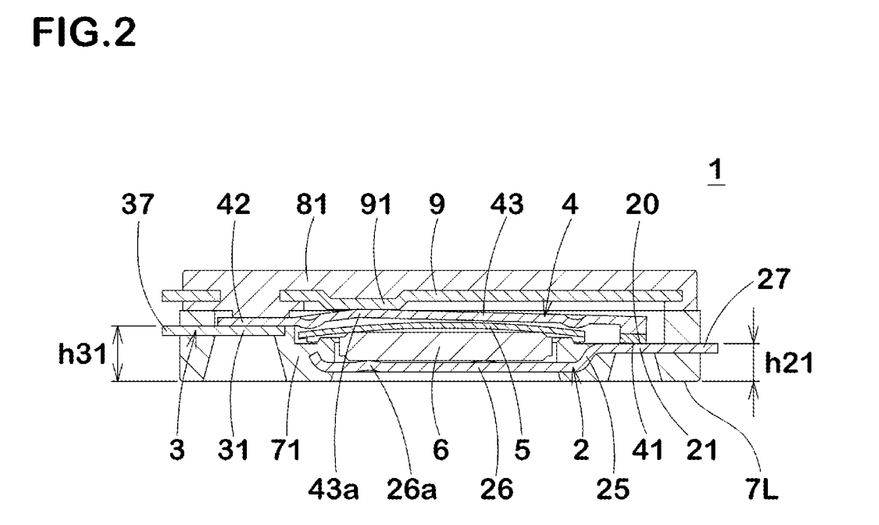
FIG. 2 a cross-sectional view showing the above-mentioned breaker in a normal charge or discharge state.
Figure 3:
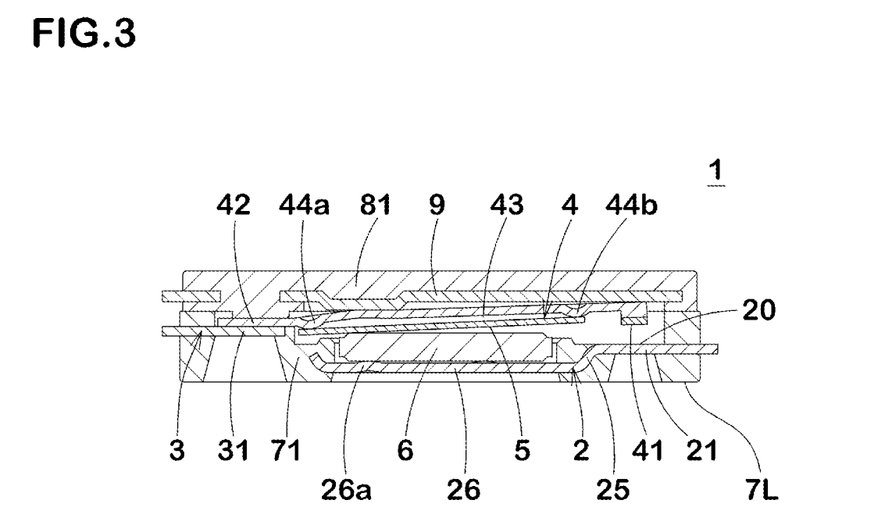

A cover piece 9 is embedded in the lid member 81 by insert molding. The cover piece 9 is formed by pressing a metal plate mainly composed of copper or the like, or a metal plate such as stainless steel or the like. As shown in FIG. 2 and FIG. 3, the cover piece 9 appropriately comes into contact with a first surface of the movable piece 4 to restrict the movement of the movable piece 4, and contributes to the miniaturization of the breaker 1 while increasing the rigidity and the strength of the lid member 81, and consequently those of the case 7 as a housing body. Resin is arranged on a side of the outer surface of the cover piece 9.

As shown in FIG. 1, the lid member 81 is attached to the case main body 71 so as to close the openings (73a), (73b), (73c), and so on of the case main body 71 which contains the terminal pieces 2 and 3, the movable piece 4, the thermally actuated element 5, and the PTC thermistor 6 and the like. The case main body 71 and the lid member 81 are joined together by ultrasonic welding, for example. At this time, the case main body 71 and the lid member 81 are continuously joined together over the entire circumference of each outer edge portion, therefore, the airtightness of the case 7 is improved. As a result, the internal space of the case 7 provided by the housing concave portion 73 is sealed, therefore, parts such as the movable piece 4, the thermally actuated element 5, and the PTC thermistor 6 can be shielded and protected from the atmosphere outside the case 7.

FIG. 2 shows the operation of the breaker 1 in a normal charge or discharge state. In a normal charge or discharge state, the thermally actuated element 5 maintains its initial shape (before the reverse warping). The cover piece 9 is provided with a protruding portion 91 which is to contact with a top portion (43a) of the movable piece 4 so as to press the top portion (43a) toward the thermally actuated element 5. By the protruding portion 91 pressing the top portion (43a), the elastic portion 43 is elastically deformed, and the movable contact 41 formed at the tip of the elastic portion 43 is pressed against and in contact with the fixed contact 20. Thereby, the terminal pieces 2 and 3 of the breaker 1 are electrically connected through the elastic portion 43 of movable piece 4 and so on. When the elastic portion 43 of the movable piece 4 and the thermally actuated element 5 are in contact with each other, the movable piece 4, the thermally actuated element 5, the PTC thermistor 6, and the terminal piece 2 may be electrically connected as a circuit. However, since the resistance of the PTC thermistor 6 is overwhelmingly larger than that of the movable piece 4, the current flowing through the PTC thermistor 6 is substantially negligible compared to the amount flowing through the fixed contact 20 and the movable contact 41.

FIG. 3 shows the operation of the breaker 1 in an overcharged state or an abnormality and the like. When the high temperature state is reached due to overcharge or abnormality, the thermally actuated element 5 that has reached the operating temperature is warped in reverse, the elastic portion 43 of the movable piece 4 is pushed up, and the fixed contact 20 and the movable contact 41 are separated. The operating temperature of the thermally actuated element 5 When the thermally actuated element 5 is deformed inside the breaker 1 and pushes up the movable piece 4 is 70 degrees Celsius or more and 90 degrees Celsius or less, for example. At this time, the current that has flowed between the fixed contact 20 and the movable contact 41 is cut off, and a slight leakage current flows through the thermally actuated element 5 and the PTC thermistor 6. The PTC thermistor 6 continues to generate heat as long as this leakage current flows, and greatly increases the resistance while maintaining the thermally actuated element 5 in the reverse warped state, therefore, the current does not flow the path between the fixed contact 20 and the movable contact 41, and only the slight leakage current described above exists (constitutes a self-holding circuit). This leakage current can be used for other functions of the safety equipment.

When the overcharge state is canceled or the abnormal state is resolved, the heat generated by the PTC thermistor 6 is also decreased, and the thermally actuated element 5 returns to the reset temperature and is restored to its initial shape. Then, the movable contact 41 and the fixed contact 20 come into contact with each other again by the elastic force of the elastic portion 43 of the movable piece 4, and the circuit is released from the cutoff state and returns to the conductive state shown in FIG. 2.

FIG. 4 shows the terminal pieces 2 and 3. The configurations of the terminal pieces 2 and 3 will be described below in detail.

The terminal piece 2 has the first portion 21 and the second portions 22 described above, third portions 23 each connecting the first portion 21 and a respective one of the second portions 22, a first bent portion (23a) formed in a region where the first portion 21 and each of the third portions 23 intersect, and a second bent portion (23b) formed in a region where each of the second portions 22 and a respective one of the third portions 23 intersect.

A pair of the second portions 22 is provided. The second portions 22 are positioned on both sides in the second direction (D2) of the first portion 21 so as to sandwich the first portion 21. In the first bent portion (23a), the terminal piece 2 is bent in a first bending direction (peak shape) such that the first surface (2U) protrudes. In the second bent portion (23b), the terminal piece 2 is bent in a second bending direction (valley shape) such that the second surface (2L) protrudes. That is, the first bent portion (23a) and the second bent portion (23b) are bent in opposite bending directions. Thereby, the first portion 21 and each of the second portions 22 are formed in a stepped shape having different heights with the third portion 23 therebetween.

The first bent portions (23a) and the second bent portions (23b) extend in parallel with the first direction (D1). Thereby, the second portions 22 each extend from the first portion 21 in the second direction (D2) perpendicular to the first direction (D1). Therefore, a length dimension in the first direction (D1) of the terminal piece 2 can be easily decreased, thereby, the breaker 1 can be downsized consequently.

Similarly, the terminal piece 3 has the first portion 31 and the second portions 32 described above, and third portions 33 each connecting the first portion 31 and a respective one of the second portions 32, a first bent portion (33a) formed in a region where the first portion 31 and each of the third portions 33 intersect, and a second bent portion (33b) formed in a region where each of the second portions 32 and a respective one of the third portions 33 intersect.

A pair of the second portions 32 is provided. The second portions 32 are positioned on both sides in the second direction (D2) of the first portion 31 so as to sandwich the first portion 31. In the first bent portion (33a), the terminal piece 3 is bent in the first bending direction (peak shape) such that the first surface (3U) protrudes. In the second bent portion (33b), the terminal piece 3 is bent in the second bending direction (valley shape) such that the second surface (3L) protrudes. That is, the first bent portion (33a) and the second bent portion (33b) are bent in the opposite bending directions. Thereby, the first portion 31 and each of the second portions 32 are formed in a stepped shape having different heights with the third portion 33 therebetween.

The first bent portions (33a) and the second bent portions (33b) extend in parallel with the first direction (D1). Thereby, the second portions 32 each extend from the first portion 31 in the second direction (D2) perpendicular to the first direction (D1). Therefore, a length dimension in the first direction (D1) of the terminal piece 3 can be easily decreased, thereby, the breaker 1 can be downsized consequently.

The terminal pieces 2 and 3 having the configurations described above can be independently used for the breaker. That is, by applying the terminal piece 2 having the configuration described above in place of the fixed piece described in the Patent document 1, the breaker can be reduced in size, or by applying the terminal piece 3 having the configuration described above in place of the terminal piece described in the Patent document 1, the breaker can be reduced in size as well.

The terminal piece 2 is embedded in the case main body 71 such that the first surface (2U) of the part ranging from each of the third portions 23 to a respective one of the second portions 22 is not exposed to the housing concave portion 73. Thereby, the terminal piece 2 is firmly fixed to the case main body 71, and the airtightness of the housing concave portion 73 is improved.

Similarly, the terminal piece 3 is embedded in the case main body 71 such that the first surface (3U) of the part ranging from each of the third portions 33 to a respective one of the second portions 32 is not exposed to the housing concave portion 73. Thereby, the terminal piece 3 is firmly fixed to the case main body 71, and the airtightness of the housing concave portion 73 is improved.

The terminal piece 2 of the present embodiment has a first protruding portion 27 extending from the first portion 21 in the first direction (D1) so as to protrude out of the case main body 71. Similarly, the terminal piece 3 has a first protruding portion 37 extending from the first portion 31 in the first direction (D1) so as to protrude out of the case main body 71. Since the first protruding portions 27 and 37 are exposed to the outside of the case 7, they can be used for connection with an external circuit.

The terminal piece 2 of the present embodiment has second protruding portions 28 each protruding from a respective one of the second portions 22 in the second direction (D2) so as to protrude outside the case main body 71. The second protruding portions 28 are arranged at both end portions in the second direction (D2) of the terminal piece 2. Similarly, the terminal piece 3 has second protruding portions 38 each protruding from a respective one of the second portions 32 in the second direction (D2) so as to protrude outside the case main body 71. The second protruding portions 38 are arranged at both end portions in the second direction (D2) of the terminal piece 3. Since the second protruding portions 28 and 38 are exposed outside the case 7, they can be used for the connection with the external circuit. When the second protruding portions 28 and 38 and the lands of the external circuit are connected by soldering, the solder may wrap around the side surfaces of the second protruding portions 28 and 38 and the first surfaces (2U) and (3U).

FIGS. 5A to 5D show the process of forming the case main body 71 in time series. The case main body 71 is formed by a mold 400 having a first mold 410 and a second mold 420, for example. In this embodiment, the terminal pieces 2 and 3 are inserted into a cavity space of the mold 400 and filled with a resin material, whereby the case main body 71 is molded. Note that, in each of the figures, a cross section taken along the second direction (D2) passing through the terminal piece 3 is shown, but the same applies to a cross section passing through the terminal piece 2.

Figure 5A:
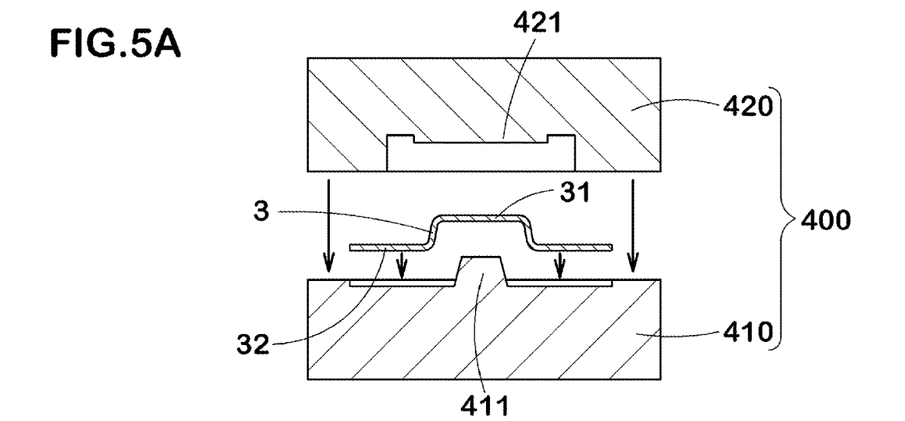
FIG. 5 cross-sectional views showing the process of forming a case main body of the breaker.
Figure 5B:
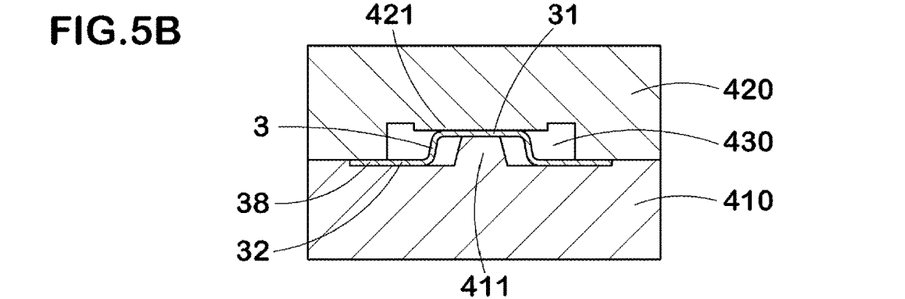

As shown in FIGS. 5A and 5B, when the terminal pieces 2 and 3 are placed on the first mold 410 and the second mold 420 is placed thereon to close it, a cavity space 430 is defined by the first mold 410 and the second mold 420. The terminal pieces 2 and 3 are inserted in the cavity space 430.

The first mold 410 has a convex portion 411 which is to contact the terminal pieces 2 and 3 inside the cavity space 430, the second mold 420 has a convex portion 421 which is to form the openings (73a) and (73b) in the case main body 71 and to contact the terminal pieces 2 and 3 inside the cavity space 430. The convex portion 411 contacts with the second surfaces (2L) and (3L) of the first portions 21 and 31 of the terminal pieces 2 and 3, and the convex portion 421 contacts with the first surfaces (2U) and (3U) of the first portions 21 and 31 of the terminal pieces 2 and 3. Thereby, the first portions 21 and 31 of the terminal pieces 2 and 3 are sandwiched between the first mold 410 and the second mold 420 inside the cavity space 430.

Further, at this time, the second protruding portions 28 and 38 of the terminal pieces 2 and 3 are in contact with the first mold 410 at the second surfaces (2L) and (3L), and are in contact with the second mold 420 at the first surfaces (2U) and (3U). Thereby, the second protruding portions 28 and 38 of the terminal pieces 2 and 3 are sandwiched by the first mold 410 and the second mold 420 outside the cavity space 430.

Similarly, the first protruding portions 27 and 37 of the terminal pieces 2 and 3 shown in FIG. 4 and so on contacts with the first mold 410 at the second surfaces (2L) and (3L), and contacts with the second mold 420 at the first surfaces (2U) and (3U). Thereby, the first protruding portions 27 and 37 of the terminal pieces 2 and 3 are sandwiched by the first mold 410 and the second mold 420 outside the cavity space 430.

Figure 5C:
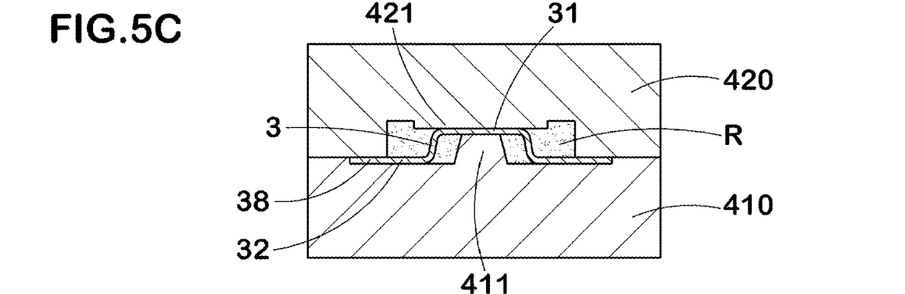

Then, as shown in FIG. 5C, the cavity space 430 is filled with a resin material for forming the case main body 71. And then, the closed state of the first mold 410 and the second mold 420 is maintained until the resin material (R) is cooled and hardened.

When the thickness of the terminal pieces 2 and 3 is decreased in order to decrease the size of the breaker 1, there is a concern that the terminal pieces 2 and 3 may be deformed by the pressure of the resin material to be filled with. And the deformation of the terminal pieces 2 and 3 in the case main body 71 may cause a change in the relative positional relationship between the fixed contact 20 and the movable contact 41, and may affect the temperature characteristics of the breaker 1. In particular, when the posture of the movable piece 4 changes due to the deformation of the terminal piece 3, the influence on the position and posture of the movable contact 41 provided at the tip of the movable piece 4 is large.

However, in this embodiment, since the first portions 21 and 31 of the terminal pieces 2 and 3 are sandwiched by the first mold 410 and the second mold 420 inside the cavity space 430, the terminal pieces 2 and 3 are prevented from being deformed by the pressure of the resin material. Furthermore, in this embodiment, since the first protruding portions 27 and 37 and the second protruding portions 28 and 38 of the terminal pieces 2 and 3 are sandwiched by the first mold 410 and the second mold 420 also outside the cavity space 430, the deformation of the terminal pieces 2 and 3 due to the pressure of the resin material is further suppressed.

In particular, in this embodiment, the second protruding portions 28 and 38 located at both end portions in the second direction (D2) of the terminal pieces 2 and 3 with the first portions 21 and 31 respectively therebetween are sandwiched by the first mold 410 and the second mold 420, therefore, the deformation of the terminal pieces 2 and 3 is further remarkably suppressed. As a result, the relative positional relationship between the fixed contact 20 and the movable contact 41 is accurately maintained, therefore, it is possible that the breaker 1 having excellent temperature characteristics is easily manufactured.

Further, the second surfaces (2L) and (3L) of the second portions 22 and 32, which are to be connected with the external circuit, contact with the first mold 410 and the second protruding portions 28 and 38 located on an outer side in the second direction (D2) are sandwiched by the first mold 410 and the second mold 420, therefore, it is possible that the precision of the second surfaces (2L) and (3L) of the second portions 22 and 32 is improved. As a result, the breaker 1 can be easily and reliably connected with the external circuit.

Figure 5D:
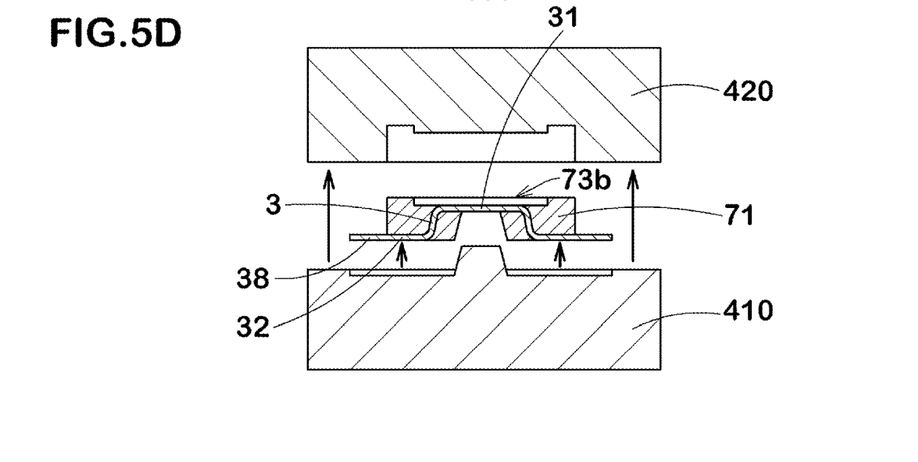

In FIG. 5C, when the filled resin material is hardened, the case main body 71 in which the terminal pieces 2 and 3 are embedded is formed. Then, as shown in FIG. 5D, the second mold 420 is separated from the first mold 410, and the case main body 71 is taken out from the first mold 410.

The case main body 71 formed as shown in FIGS. 5A to 5D is used for assembling the breaker 1 as shown in FIG. 1.

Figure 6:
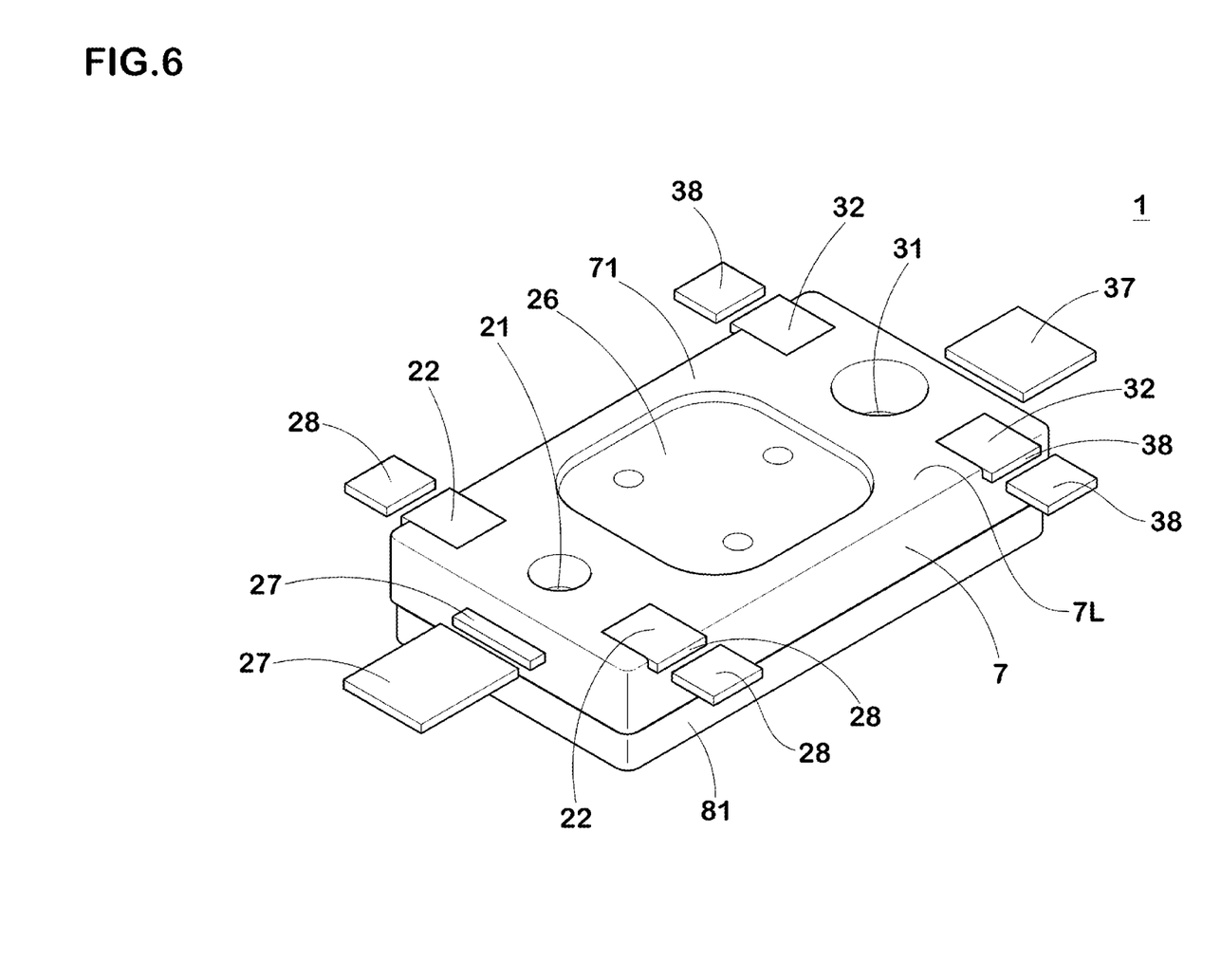
FIG. 6 a perspective view from the bottom side of the above-mentioned breaker.

FIG. 6 is a perspective view from the bottom side of the breaker 1 in which the PTC thermistor 6, the thermally actuated element 5, and the movable piece 4 are accommodated in the case main body 71 and the lid member 81 is welded to the case main body 71.

After the lid member 81 is welded to the case main body 71, the first protruding portions 27 and 37 can be appropriately cut outside the case 7. By cutting the first protruding portions 27 and 37, the length in the first direction (D1) of the breaker 1 is shortened. Similarly, the second protruding portions 28 and 38 can be appropriately cut outside the case 7. By cutting the second protruding portions 28 and 38, the length in the second direction (D2) of the breaker 1 is shortened. As a result of these, the breaker 1 can be miniaturized.

Second Embodiment

Figure 7:
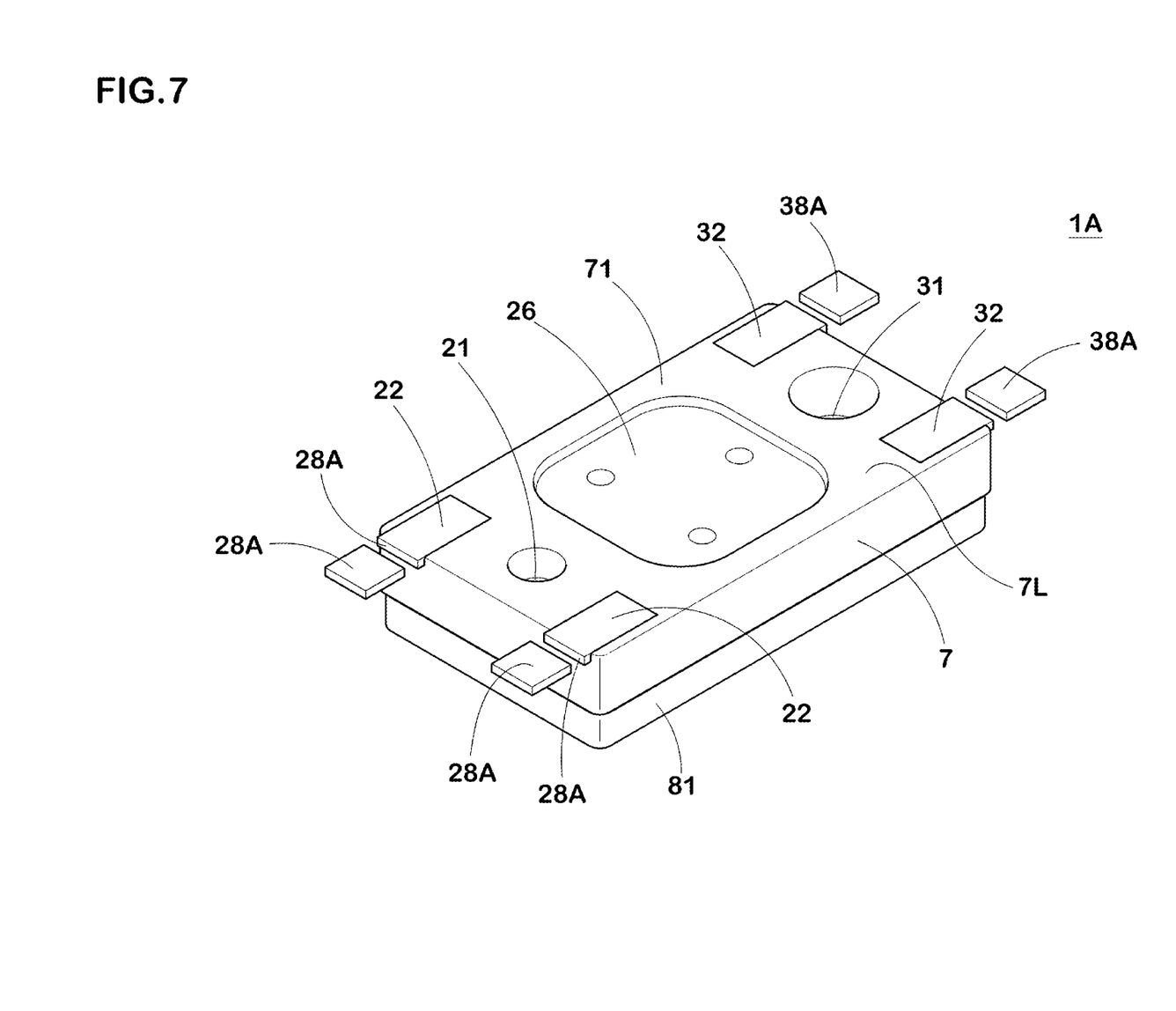
FIG. 7 a perspective view from the bottom side of a breaker according to another embodiment of the present invention.
Figure 8:
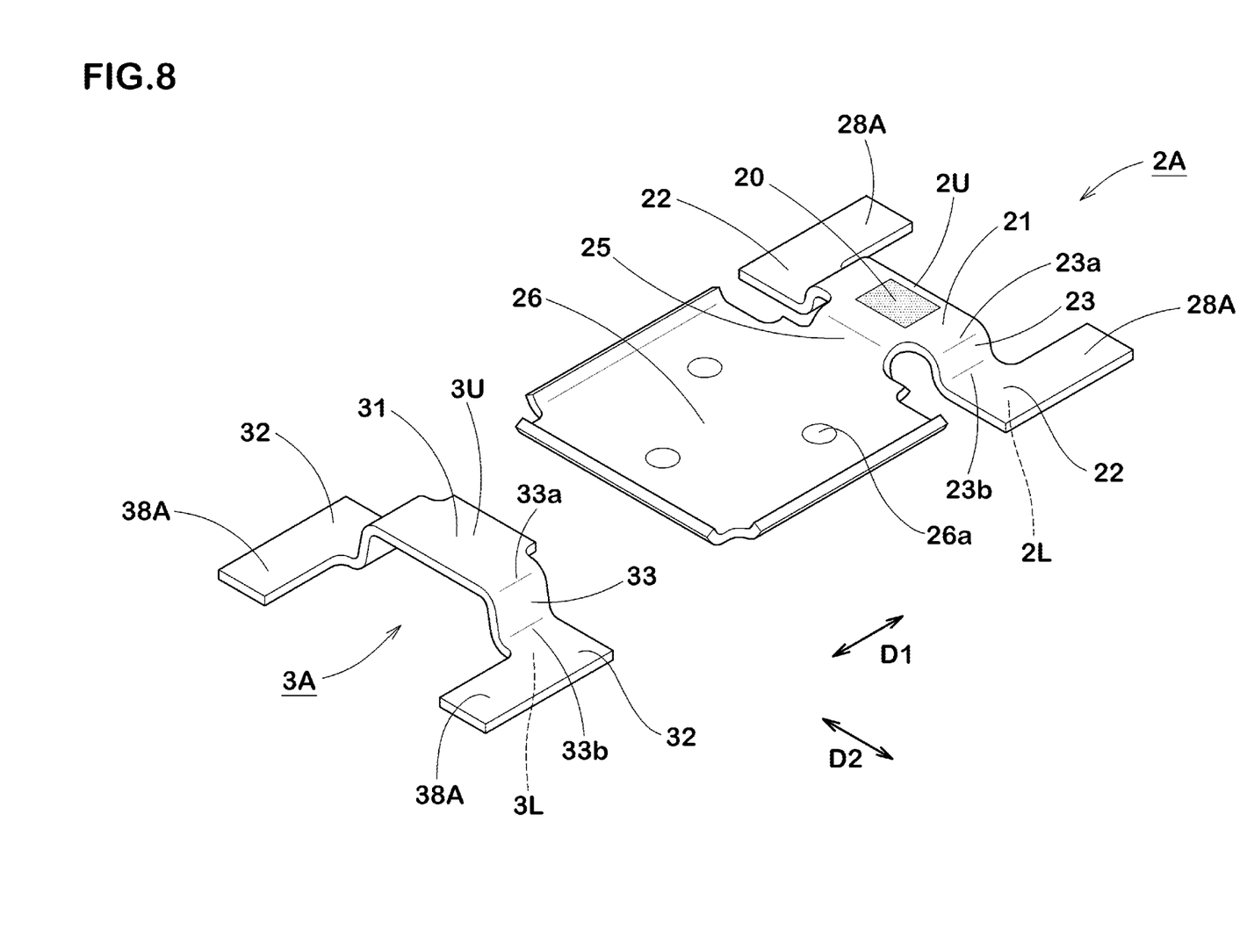
FIG. 8 a perspective view showing the configuration of the terminal pieces of the above-mentioned breaker.

FIG. 7 shows a breaker (1A) according to another embodiment of the present invention. Further, FIG. 8 shows the configuration of a terminal pieces (2A) and (3A) used for the breaker (1A).

The breaker (1A) is different from the breaker 1 described above in that second protruding portions (28A) and (38A) of the terminal pieces (2A) and (3A) extend from the second portions 22 and 32 in the first direction (D1) so as to protrude outside the case main body 71. For the parts of the breaker (1A) which are not described below, the configuration of the breaker 1 described above can be adopted.

In the breaker (1A), since the second protruding portions (28A) and (38A) extend from the second portions 22 and 32 in the first direction (D1), the length in the second direction (D2) of the breaker (1A) can be easily shortened. And then, as the extending direction of the second protruding portions (28A) and (38A) is changed from the second direction (D2) to the first direction (D1) of the breaker 1, the first protruding portions 27 and 37 are removed from the breaker 1.

As shown in FIG. 7, after the lid member 81 is welded to the case main body 71, the second protruding portions (28A) and (38A) can be appropriately cut outside the case 7. By cutting the second protruding portions (28A) and (38A), the length in the first direction (D1) of the breaker (1A) is shortened. As a result, the breaker (1A) can be reduced in size.

The terminal pieces (2A) and (3A) having the configuration described above can be independently used for the breaker. That is, the terminal piece (2A) instead of the terminal piece 2 can be used for the breaker 1, or the terminal piece (3A) instead of the terminal piece 3 can be used for the breaker 1 as well. In any form, it is possible to reduce the size of the conventional breaker disclosed in the Patent document 1 and so on.

The breaker 1 and so on of the present invention can be embodied in various forms without being limited to the configurations of the above-illustrated embodiments. That is, the breaker 1 and so on suffice as long as they have at least the fixed contact 20, the movable piece 4 including the elastic portion 43, which extends in the first direction (D1) and deforms elastically, and the movable contact 41 arranged at the end portion on one side of the elastic portion 43, and having the movable contact 41 so as to be pressed against and in contact with the fixed contact 20, the thermally actuated element 5 actuating the movable piece 4 such that the movable contact 41 is separated from the fixed contact 20 by being deformed in accordance with a temperature change, the case 7 accommodating the movable piece 4 and the thermally actuated element 5, and the terminal pieces 2 and 3 which partially protrudes outside the case 7 and is to be electrically connected with an external circuit, wherein the terminal pieces 2 and 3 have the first portions 21 and 31 having the first height from the bottom surface of the case 7, the second portions 22 and 32 connected to the external circuit at the second height, which is lower than the first height, from the bottom surface of the case 7, the third portions 23 and 33 connecting the first portions 21 and 31 and the second portions 22 and 32, the first bent portions (23a) and (33a) bent in the first bending direction in the region where the first portions 21 and 31 and the third portions 23 and 33 intersect, and the second bent portions (23b) and (33b) bent in the second bending direction opposite to the first bending direction in the region where the second portions 22 and 32 and the third portions 23 and 33 intersect, and the first bent portions (23a) and (33a) and the second bent portions (23b) and (33b) extend in parallel with the first direction (D1).

For example, the joining method of the case main body 71 and the lid member 81 is not limited to ultrasonic welding, and other methods can be appropriately applied as long as both are firmly joined. Both may be adhered together by applying or filling and then curing a liquid or gel adhesive, for example. Further, the case 7 is not limited to the configuration constituted by the case main body 71, the lid member 81, and the like, but the configuration suffices as long as it is constituted by two or more parts.

Furthermore, the case 7 may be sealed with a resin or the like by secondary insert molding or the like. In this case, the first protruding portions 27 and 37 and the second protruding portions 28 and 38 of the terminal pieces 2 and 3 are sandwiched by molds for the secondary insert molding, whereby deformation of the terminal pieces 2 and 3 is prevented.

Further, the PTC thermistor 6 may be omitted in applications where the self-holding circuit described above is unnecessary.

Furthermore, the movable piece 4 and the thermally actuated element 5 may be integrally formed by forming the movable piece 4 of a laminated metal such as bimetal or tri-metal. In this case, the configuration of the breaker is simplified, therefore, further miniaturization can be achieved.

Further, the present invention may be applied to the configuration in which the terminal piece 3 and the movable piece 4 are integrally formed as shown in the Patent Application Publication No. WO2011/105175. In this case, the terminal piece 3 and the movable piece 4 formed integrally are formed in a T-shape in plan view, therefore, the length in the first direction (D1) of breaker 1 is shortened. Furthermore, the terminal piece 2 of the present invention may be used instead of the fixed piece of the above publication.

Figure 9:
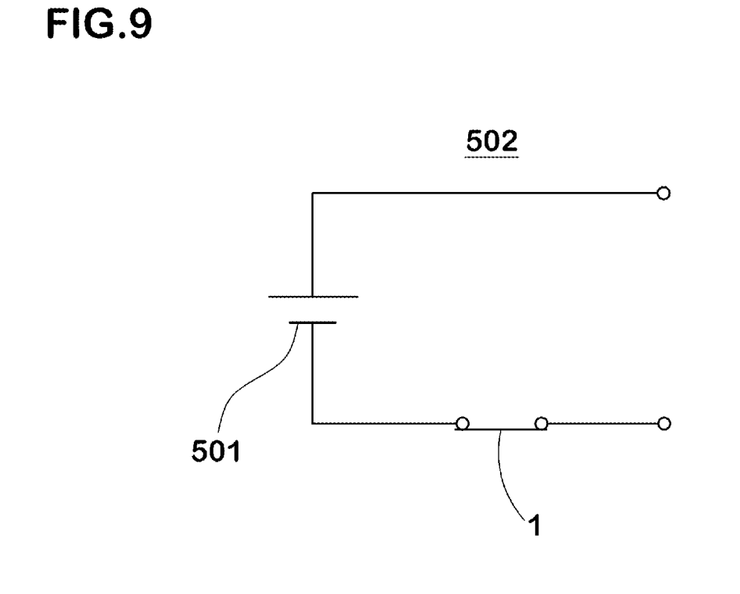
FIG. 9 a circuit diagram of the safety circuit provided with the above-mentioned breaker of the present invention.

Further, the breaker 1 and so on of the present invention can be widely applied to the safety circuits for an electrical device and the like. FIG. 9 shows a safety circuit 502 for an electrical device. The safety circuit 502 includes the breaker 1 in series in an output circuit of a secondary battery 501. According to the safety circuit 502 including the breaker 1, the safety circuit 502 can be easily miniaturized.

Moreover, the breaker 1 of the present invention can also be applied to a connector disclosed in Japanese Unexamined Patent Application Publication No. 2016-225142. In this case, the connector can be easily miniaturized.

DESCRIPTION OF THE REFERENCE NUMERALS 1 breaker
1A breaker
2 terminal piece
2A terminal piece
2L second surface
2U first surface
3 terminal piece
3A terminal piece
3L second surface
3U first surface
4 movable piece
5 thermally actuated element
7 case
20 fixed contact
21 first portion
22 second portion
23 third portion
23a first bent portion
23b second bent portion
27 first protruding portion
28 second protruding portion
28A second protruding portion
31 first portion
32 second portion
33 third portion
33a first bent portion
33b second bent portion
37 first protruding portion
38 second protruding portion
38A second protruding portion
41 movable contact
43 elastic portion
73 housing concave portion (internal space)
D1 first direction
D2 second direction
h21 first height
h22 second height
h31 first height
h32 second height

What is claimed is:
1. A breaker comprising:
a fixed contact;
a movable piece including an elastic portion, which extends in a first direction and deforms elastically, the movable piece having an elongated shape, the first direction being a longitudinal direction of the movable piece, and a movable contact arranged at an end portion on one side of the elastic portion, and having the movable contact so as to be pressed against and in contact with the fixed contact;
a thermally actuated element actuating the movable piece such that the movable contact is separated from the fixed contact by being deformed in accordance with a temperature change;
a case accommodating the movable piece and the thermally actuated element; and
a first terminal piece and a second terminal piece each partially protruding outside the case to be electrically connected with an external circuit, wherein
each of the first and second terminal pieces has
a first portion having a first height from a second surface of the case,
second portions connected to the external circuit at a second height, which is lower than the first height, from the second surface of the case,
third portions each connecting the first portion and a respective one of the second portions,
first bent portions each bent in a first bending direction in a region where the first portion and a respective one of the third portions intersect, and
second bent portions each bent in a second bending direction opposite to the first bending direction in a region where each of the second portions and a respective one of the third portions intersect,
the fixed contact is formed in the first portion of the first terminal piece,
in the first terminal piece, a main surface on which the fixed contact is formed is defined as a first surface and another main surface opposite to the first surface is defined as a second surface,
in the second terminal piece, a main surface positioned on the same side as the first surface of the first terminal piece is defined as a first surface and another main surface is defined as a second surface,
the second surface of the case comprises a main surface of the case positioned on the same side as the second surface of the first terminal piece,
the first bent portions and the second bent portions extend in parallel with the first direction,
the case has an internal space for accommodating the movable piece and the thermally actuated element,
in each of the first and second terminal pieces,
a portion of the first surface corresponding to the first portion is exposed to the internal space,
the second portions are embedded in the case such that portions of the first surface corresponding to the second portions are not exposed to the internal space,
the second portions are arranged so as to oppose with the first portion therebetween, and
when viewed in a thickness direction of the first portion, the first portion and the second portions are aligned on a single linear line.
2. The breaker as set forth in claim 1, wherein
an end portion on the other side of the elastic portion is electrically connected with the first portion of the second terminal piece.

3. The breaker as set forth in claim 1, wherein
in each of the first and second terminal pieces, portions of the second surface corresponding to the second portions are exposed to the outside of the case.

4. A safety circuit for an electric device comprising the breaker as set forth in claim 1.

5. A breaker comprising:
a fixed contact;
a movable piece including an elastic portion, which extends in a first direction and deforms elastically, the movable piece having an elongated shape, the first direction being a longitudinal direction of the movable piece, and a movable contact arranged at an end portion on one side of the elastic portion, and having the movable contact so as to be pressed against and in contact with the fixed contact;
a thermally actuated element actuating the movable piece such that the movable contact is separated from the fixed contact by being deformed in accordance with a temperature change;
a case accommodating the movable piece and the thermally actuated element; and
a first terminal piece and a second terminal piece each partially protruding outside the case to be electrically connected with an external circuit, wherein
each of the first and second terminal pieces has
 a first portion having a first height from a second surface of the case,
 second portions connected to the external circuit at a second height, which is lower than the first height, from the second surface of the case,
 third portions each connecting the first portion and a respective one of the second portions,
 first bent portions each bent in a first bending direction in a region where the first portion and a respective one of the third portions intersect, and
 second bent portions each bent in a second bending direction opposite to the first bending direction in a region where each of the second portions and a respective one of the third portions intersect,
the fixed contact is formed in the first portion of the first terminal piece,
in the first terminal piece, a main surface on which the fixed contact is formed is defined as a first surface and another main surface opposite to the first surface is defined as a second surface,
in the second terminal piece, a main surface positioned on the same side as the first surface of the first terminal piece is defined as a first surface and another main surface is defined as a second surface,
the second surface of the case comprises a main surface of the case positioned on the same side as the second surface of the first terminal piece,
the first bent portions and the second bent portions extend in parallel with the first direction,
each of the first and second terminal pieces has a first protruding portion extending from the first portion in the first direction so as to protrude outside the case,
in each of the first and second terminal pieces,
 the second portions are arranged so as to oppose with the first portion therebetween, and
 when viewed in a thickness direction of the first portion, the first portion and the second portions are aligned on a single linear line.

6. The breaker as set forth in claim 5, wherein
an end portion on the other side of the elastic portion is electrically connected with the first portion of the second terminal piece.

7. The breaker as set forth in claim 5, wherein
in each of the first and second terminal pieces, portions of the second surface corresponding to the second portions are exposed to the outside of the case.

8. A safety circuit for an electric device comprising the breaker as set forth in claim 5.

9. A breaker comprising:
a fixed contact;
a movable piece including an elastic portion, which extends in a first direction and deforms elastically, the movable piece having an elongated shape, the first direction being a longitudinal direction of the movable piece, and a movable contact arranged at an end portion on one side of the elastic portion, and having the movable contact so as to be pressed against and in contact with the fixed contact;
a thermally actuated element actuating the movable piece such that the movable contact is separated from the fixed contact by being deformed in accordance with a temperature change;
a case accommodating the movable piece and the thermally actuated element; and
a first terminal piece and a second terminal piece each partially protruding outside the case to be electrically connected with an external circuit, wherein
each of the first and second terminal pieces has
 a first portion having a first height from a second surface of the case,
 second portions connected to the external circuit at a second height, which is lower than the first height, from the second surface of the case,
 third portions each connecting the first portion and a respective one of the second portions,
 first bent portions each bent in a first bending direction in a region where the first portion and a respective one of the third portions intersect, and
 second bent portions each bent in a second bending direction opposite to the first bending direction in a region where each of the second portions and the third portions intersect,
the fixed contact is formed in the first portion of the first terminal piece,
in the first terminal piece, a main surface on which the fixed contact is formed is defined as a first surface and another main surface opposite to the first surface is defined as a second surface,
in the second terminal piece, a main surface positioned on the same side as the first surface of the first terminal piece is defined as a first surface and another main surface is defined as a second surface,
the second surface of the case is a main surface of the case positioned on the same side as the second surface of the first terminal piece,
the first bent portions and the second bent portions extend in parallel with the first direction,
each of the first and second terminal pieces has second protruding portions each extending from a respective one of the second portions in a second direction perpendicular to the first direction so as to protrude outside the case,
in each of the first and second terminal pieces,
 the second portions are arranged so as to oppose with the first portion therebetween, and when viewed in a thickness direction of the first portion, the first portion and the second portions are aligned on a single linear line.

10. The breaker as set forth in claim 9, wherein, an end portion on the other side of the elastic portion is electrically connected with the first portion of the second terminal piece.

11. The breaker as set forth in claim 9, wherein, in each of the first and second terminal pieces, portions of the second surface corresponding to the second portions are exposed to the outside of the case.

12. The breaker as set forth in claim 9, wherein, in each of the first and second terminal pieces, the second protruding portions are arranged at both end portions in the second direction.

13. A safety circuit for an electric device comprising the breaker as set forth in claim 9.

* * * * *